(12) United States Patent
Muthukumar et al.

(10) Patent No.: US 6,820,250 B2
(45) Date of Patent: Nov. 16, 2004

(54) MECHANISM FOR SOFTWARE PIPELINING LOOP NESTS

(75) Inventors: Kalyan Muthukumar, Cupertino, CA (US); Gautam B. Doshi, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/143,163

(22) Filed: May 9, 2002

(65) Prior Publication Data

US 2004/0015934 A1 Jan. 22, 2004

Related U.S. Application Data

(63) Continuation of application No. 09/327,211, filed on Jun. 7, 1999, now abandoned.

(51) Int. Cl.$^7$ .............................................. G06F 9/44
(52) U.S. Cl. ...................................... 717/116; 717/150
(58) Field of Search ............................... 712/241, 244; 717/9

(56) References Cited

U.S. PATENT DOCUMENTS

| | | | | |
|---|---|---|---|---|
| 5,230,053 A | * | 7/1993 | Zaiki | 717/150 |
| 5,361,354 A | * | 11/1994 | Greyzck | 717/160 |
| 5,704,053 A | * | 12/1997 | Santhanam | 717/158 |
| 5,774,370 A | * | 6/1998 | Giomi | 716/4 |
| 5,790,859 A | * | 8/1998 | Sarkar | 717/130 |
| 5,842,022 A | * | 11/1998 | Nakahira et al. | 717/160 |
| 5,852,734 A | * | 12/1998 | Komatsu et al. | 717/156 |
| 5,901,318 A | * | 5/1999 | Hsu | 717/161 |
| 5,920,724 A | * | 7/1999 | Chang | 717/161 |
| 5,950,007 A | * | 9/1999 | Nishiyama et al. | 717/161 |
| 5,958,048 A | * | 9/1999 | Babaian et al. | 712/241 |
| 5,974,538 A | * | 10/1999 | Wilmot, II | 712/218 |
| 6,016,399 A | * | 1/2000 | Chang | 717/160 |
| 6,055,627 A | * | 4/2000 | Kyushima et al. | 712/233 |
| 6,070,011 A | * | 5/2000 | Liu et al. | 717/160 |
| 6,074,433 A | * | 6/2000 | Haraguchi et al. | 717/160 |
| 6,148,437 A | * | 11/2000 | Shah et al. | 717/128 |
| 6,173,443 B1 | * | 1/2001 | Wakatani | 717/160 |
| 6,178,498 B1 | * | 1/2001 | Sharangpani et al. | 712/239 |
| 6,178,499 B1 | * | 1/2001 | Stotzer et al. | 712/241 |
| 6,192,515 B1 | * | 2/2001 | Doshi et al. | 717/161 |
| 6,438,682 B1 | * | 8/2002 | Morris et al. | 712/241 |
| 6,571,385 B1 | * | 5/2003 | Muthukumar et al. | 717/150 |

OTHER PUBLICATIONS

"Synthesis and Optimization of Digital Circuits", Giovanni De Micheli, Mc Graw–Hill Inc., published 1994, Chapter 5, Scheduling Algorithms, pp. 185–228.*
Advanced Computer Design & Implementation, Steven S. Muchnick, pp. 548–551 Aug. 19, 1997.*

* cited by examiner

*Primary Examiner*—Todd Ingberg
(74) *Attorney, Agent, or Firm*—Shireen I. Bacon

(57) ABSTRACT

A method is provided for processing nested loops that include a modulo-scheduled inner loop within an outer loop. The nested loop is scheduled to execute the epilog stage of the inner loop for a given iteration of the outer loop with the prolog stage of the inner loop for the next iteration of the outer loop. For one embodiment of the invention, this is accomplished by initializing an epilog counter for the inner loop to a value that bypasses draining the software pipeline. This causes the processor to exit the inner loop before it begins draining the inner loop pipeline. The inner loop pipeline is drained during the next iteration of the outer loop, while the inner loop pipeline fills for the next iteration of the outer loop.

29 Claims, 10 Drawing Sheets

MECHANISM FOR SOFTWARE PIPELINING LOOP NESTS

The present patent application is a Continuation of prior application No. 09/327,211, filed now ABANDONED, entitled MECHANISM FOR SOFTWARE PIPELINING LOOP NESTS

BACKGROUND OF THE INVENTION

1. Technical Field

The present invention relates to mechanisms for optimizing computer code, and in particular, to mechanisms for improving the performance of software pipelined loops.

2. Background Art

Software pipelining is a method for scheduling non-dependent instructions from different logical iterations of a program loop to execute concurrently. Overlapping instructions from different logical iterations of the loop increases the amount of instruction level parallelism (ILP) in the program code. Code having high levels of ILP uses the execution resources available on modern, superscalar processors more effectively.

A loop is software pipelined by organizing the instructions of the loop body into stages of one or more instructions each. These stages form a software pipeline having a pipeline depth equal to the number of stages (the "stage count" or "SC") of the loop body. The instructions for a given loop iteration enter the software pipeline stage by stage, on successive initiation intervals (II), and new loop iterations begin on successive initiation intervals until all iterations of the loop have been started. Each loop iteration is thus processed in stages through the software pipeline in much the same way that an instruction is processed in stages through a processor pipeline. When the software pipeline is full, stages from SC sequential loop iterations are in process concurrently, and one loop iteration completes every initiation interval. Various methods for software pipelining loops are discussed, for example, in B.R. Rau, M.S. Schlansker, P.P. Tirumalai, Code Generation Schema for Modulo Scheduled Loops IEEE MICRO Conference 1992 (Portland, Oregon).

FIG. 1A is a schematic representation of a software pipeline as it processes an exemplary loop through 100 iterations (trip count=100). The instructions of the loop are organized into five stages, labeled A through E (SC=5), and each stage is indexed by the logical iteration to which it corresponds. For example, A(1) is the first iteration of the loop body instruction(s) in stage A, and D(98) is the 98$^{th}$ iteration of the loop body instruction(s) in stage D. The software pipeline fills during a prolog phase 120, as stages from the first iterations of the loop begin on successive initiation intervals, II(1)–II(4). The software pipeline is full during a kernel phase 130 from II(5) through II(100), and it empties during an epilog phase 140, as the last four iterations complete during II(101)–II(104).

In practice, the different stages of the loop body do not physically traverse a pipeline, as indicated in FIG. 1A. For example, a software pipelined loop that is implemented through predication provides all stages of the loop on each initiation interval. The pipeline filling/emptying behavior is effected by predicates associated with the stages ("stage predicates").

FIG. 1B represents the software pipeline of FIG. 1A in compact, predicated form. Here, stages A through E are associated with predicates p1 through p5, respectively. Setting the predicates p1 through p5 true on successive initiation intervals activates the associated stages and replicates the pipeline filling behavior of prolog phase 120. Similarly, setting predicates p1 through p5 false on successive initiation intervals, deactivates the associated stages and replicates the pipeline emptying behavior of epilog phase 140. During kernel phase 130, all predicates are true, and an instruction stage from each of five sequential loop iterations is active.

Predication thus simplifies the scheduling issues associated with software pipelined loops. All stages of the software pipeline are present in each initiation interval. Only instructions in those stages that are activated by their associated stage predicates update the architectural state of the processor ("processor state") when they retire. Instructions in stages that are deactivated by their associated stage predicates are treated as no-operations (NOPs), and any results they generate do not update the processor state.

The dynamics of a software pipelined loop depend, in part, on the relative sizes of its trip count (TC) and its stage count (SC). A kernel phase, in which a new iteration begins and one iteration ends on each iteration interval, is present only for loops in which the trip count is greater than the stage count. For loops having relatively short trip counts, e.g. those in which the number of iterations is less than SC, the software pipeline never fills because there are more stages than there are loop iterations to fill the stages. Consequently, a short trip count loop does not have a kernel phase.

Independent of the number of iterations and stages, prolog and epilog phases 120, 140, respectively, represent overhead associated with filling and emptying the software pipelined loop. The empty stages in FIG. 1A during prolog and epilog phases 120 and 140, respectively, or the deactivated stages in FIG. 1B, represent unused processor resources. These unused resources can lead to significant efficiency losses when the software pipelined loop is nested within an outer loop, because the overhead is incurred on each iteration of the outer loop.

FIG. 1C represents a nested loop 170 that includes the software pipelined loop of FIG. 1A within a counted outer loop. FIG. 1D represents a nested loop 180 that includes a short trip count loop within a counted outer loop. In both cases, overhead associated with inner loop prolog and epilog phases 120 and 140, respectively, is incurred on each iteration of the outer loop. Between each iteration of the inner loop, the outer loop implements any other instructions in its loop body, including those necessary to set up the inner loop for execution.

The present invention addresses these and other inefficiencies related to implementing nested loops using software pipelining techniques.

SUMMARY OF THE INVENTION

The present invention supports efficient processing of nested loops that include a software pipelined inner loop within an outer loop. The inner loop is executed without draining its software pipeline until the final iteration of the outer loop is reached. This eliminates the overhead associated with prolog and epilog stages of the inner loop for all but the first and last iterations, respectively, of the outer loop.

In accordance with the present invention, the software pipelined inner loop of the nested loop is executed in a "no-drain" mode for the first N−1 iterations of an N-iteration outer loop. For the last iteration of the outer loop, the software pipelined inner loop is executed in a "drain" mode.

For one embodiment of the present invention, no-drain mode is established by initializing an epilog counter for the inner loop to a first value for the first N-1 iterations of the outer loop. When the final iteration of the outer loop is detected, the epilog counter for the inner loop is set to a second value. The first value indicates that the pipeline should not be drained. The second value indicates the actual number of stages in the software pipelined inner loop to be drained. For other embodiments, the values written to the epilog counter for the drain and no-drain modes may be adjusted to account for instruction dependencies between the inner and outer loops.

BRIEF DESCRIPTION OF THE DRAWINGS

The present invention may be understood with reference to the following drawings, in which like elements are indicated by like numbers. These drawings are provided to illustrate selected embodiments of the present invention and are not intended to limit the scope of the invention.

DETAILED DESCRIPTION OF THE INVENTION

Figure 1A:
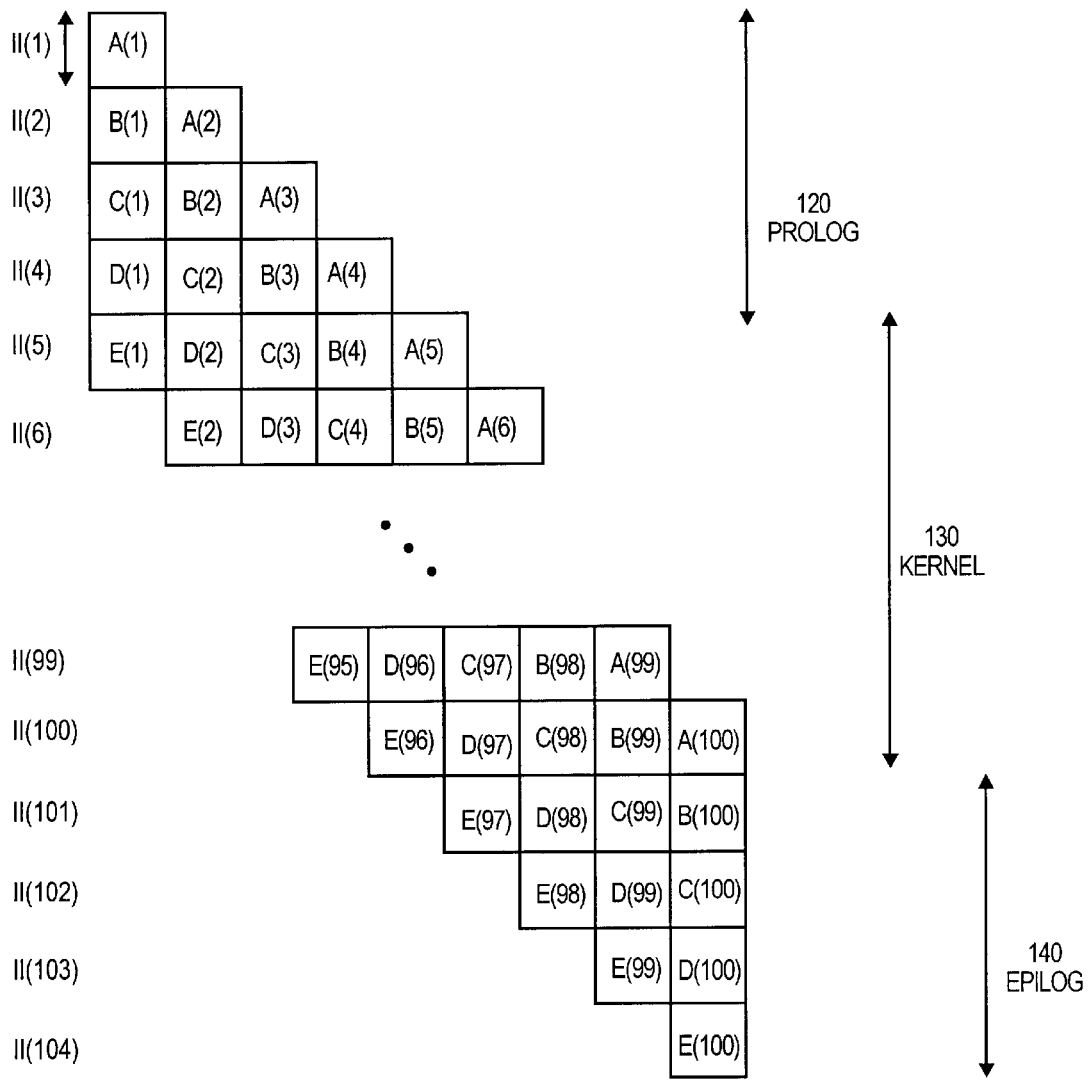
FIG. 1A represents the prolog, kernel, and epilog phases of a software pipelined loop.
Figure 1B:
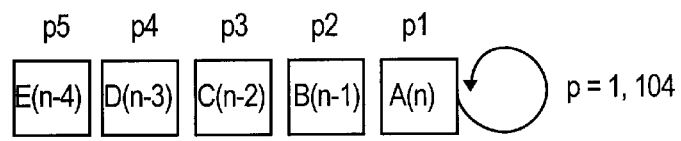
FIG. 1B represents a predicated implementation of the software pipelined loop of FIG. 1A.

The following discussion sets forth numerous specific details to provide a thorough understanding of the invention. However, those of ordinary skill in the art, having the benefit of this disclosure, will appreciate that the invention may be practiced without these specific details. In addition, various well-known methods, procedures, components, and circuits have not been described in detail in order to focus attention on the features of the present invention.

The present invention supports efficient processing of nested loops that include software pipelined inner loops. It does so by reducing the overhead associated with the prolog and epilog phases of the software pipelined inner loops. In accordance with the present invention, the epilog phase of the inner loop for the $J^{th}$ iteration of the outer loop is overlapped with the prolog phase of the inner loop for $J+1^{st}$ iteration of the outer loop. This hides the overhead associated with filling and draining the inner loop's software pipeline for all but the first and last iterations of the outer loop, respectively.

For one embodiment of the invention, the inner loop is executed in a "no-drain" mode for each iteration of the outer loop but the final iteration. In "no-drain" mode, the inner loop is executed until the epilog phase is reached. The epilog phase of the inner loop (or a portion of it) is bypassed, while the next iteration of the outer loop initialized. When the next iteration of the outer loop executes, the inner loop pipeline corresponding to the previous iteration of the outer loop drains, while the inner loop pipeline corresponding to the current iteration of the outer loop fills. On the final iteration of the outer loop, the inner loop is executed in a "drain" mode. In "drain" mode, the epilog phase of the inner loop executes when it is reached, to fully drain the software pipeline.

The present invention is illustrated for a processor architecture that employs register rotation to manage the registers used in software pipelined loops and predication to activate and deactivate stages during the different phases of the loop. Register rotation is a register renaming method designed to manage registers in software pipelined loops. Register rotation maps the virtual register identifiers (IDs) specified by the loop body instructions to a different set of physical registers for each iteration of the loop. This prevents instructions in different iterations of the loop from writing to the same registers. Register rotation is described, for example, in Rau, B. R., Lee, M., Tirumalai, P., and Schlansker, M. S. *Register Allocation For Software Pipelined Loops*, Proceeding s of the SIGNPLAN '92 Conference on Programming Language Design and Implementation, (San Francisco, 1992).

Embodiments of the present invention may also be implemented without register rotation or predication. For these embodiments, the code will be substantially more complex and the footprint of the code in memory will be significantly larger (code expansion).

The illustrated processor architecture also employs a loop counter (LC) and an epilog counter (EC) to track the status of software pipelined loops. LC tracks the number of loop iterations that still have to be executed for a counted loop, indicating for example, whether the epilog phase has been reached (LC =0). For while-type loops, a predicate associated with the loop branch instruction ("branch predicate") indicates the status of the loop. For both while and counted loops, EC tracks the number of active stages in the software pipelined loop. Although these features simplify implementation of the present invention, they are not required. Embodiments of the present invention may be implemented in any processor architecture that allows the phase of the loop to be tracked.

Figure 2A:
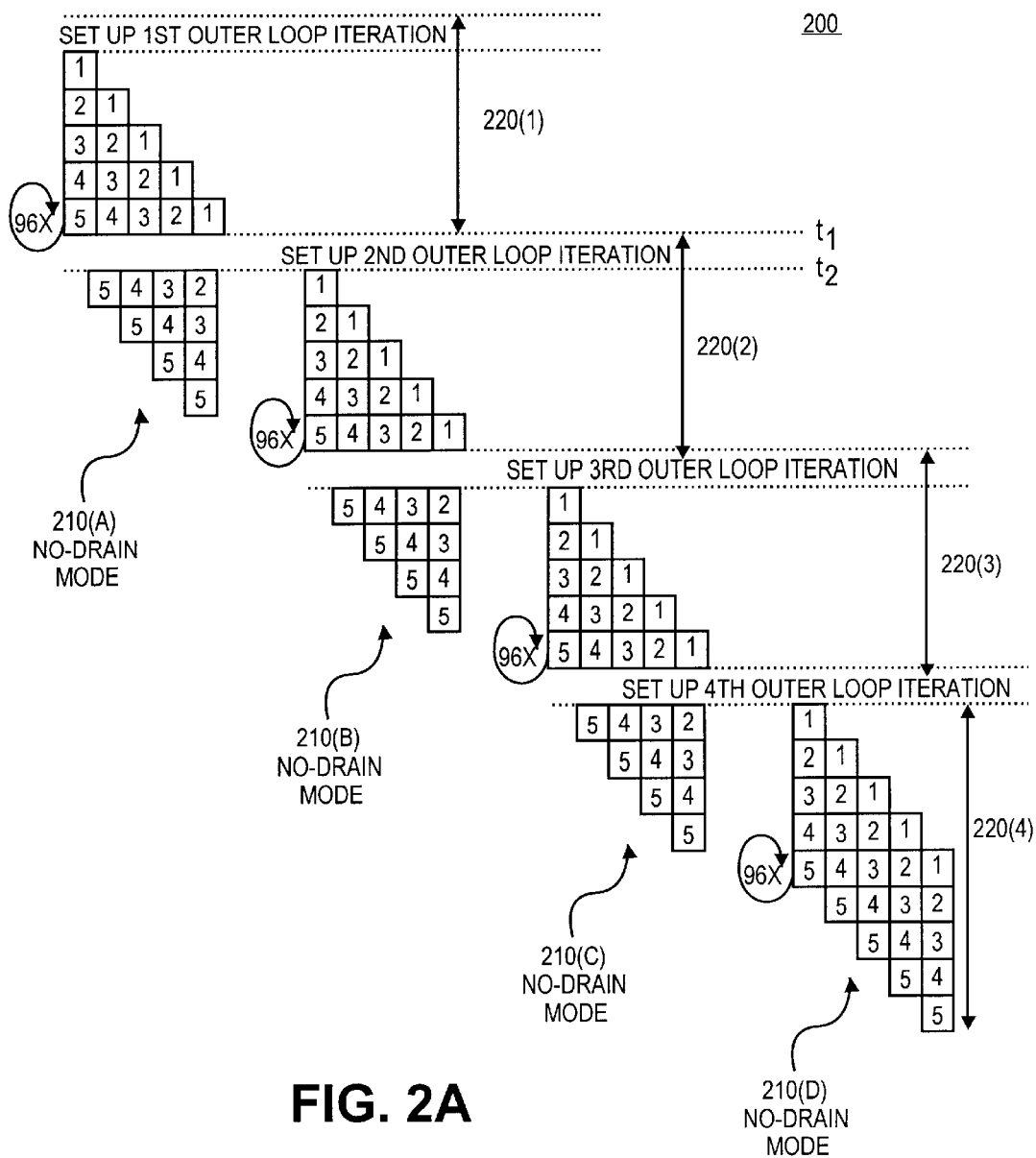
FIG. 2A represents a nested loop that has been implemented in accordance with the present invention.

FIG. 2A is a schematic representation of a nested loop 200 that is processed in accordance with the present invention. Nested loop 200 includes a modulo-scheduled inner loop 210 that is executed on each of four outer loop iterations 220(1)–220(4) (collectively, outer loop 220). Instantiations of inner loop 210 in different outer loop iterations 220 are designated by indices a, b, c, d. The body of inner loop 210 is organized into five stages, which are executed one hundred times for each iteration of outer loop 220. Since TC>SC, a kernal phase is present, as indicated by the curved arrow.

Figure 2B:
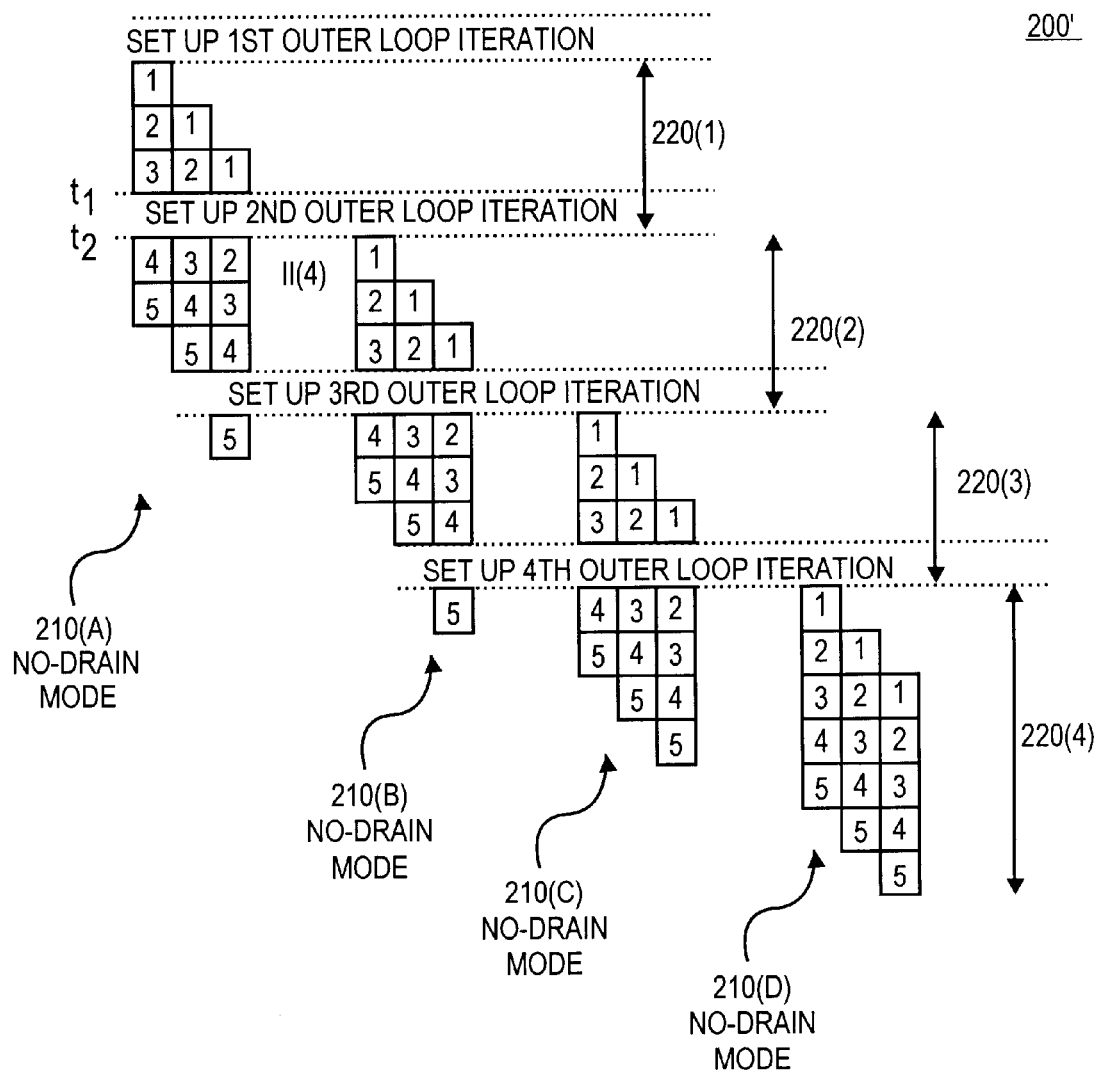
FIG. 2B represents a short trip count nested loop that has been implemented in accordance with the present invention.

FIG. 2B illustrates application of the present invention to a nested loop 200' having a short trip count inner loop (TC=3<SC=5). While the present invention does not depend on the relative magnitudes of TC and SC, the benefits it provides may be more evident in short trip count loops, since they have lower ILP than loops having a kernal phase. Except where noted, the following discussion applies to both types of loop, regardless of the relative magnitudes of TC and SC.

On the first iteration of outer loop 220, i.e. 220(1), inner loop 210(a) is initialized in "no-drain" mode. In "no-drain" mode, inner loop 210(a) is executed until its epilog phase is reached at $t_1$. The second iteration of outer loop 220, i.e. 220(2), is initiated between $t_1$ and $t_2$ with inner loop 210(b) again initialized in "no-drain" mode. When the second iteration of the outer loop begins, the software pipeline for inner loop 210(a) drains, while the software pipeline for inner loop 210(b) fills. A similar pattern occurs for the third iteration of the outer loop. For the last iteration of outer loop 220, inner loop 210(d) is initialized in drain mode, which allows it to complete normally. That is, inner loop 210(d) enters an epilog phase following its kernel phase, allowing its software pipeline to drain.

Register rotation ensures that registers associated with different iterations of inner loop 210 in the same or different iterations of the outer loop remain segregated. This allows, for example, the epilog of inner loop 210(a) to execute concurrently with the prolog of inner loop 210(b).

For the short trip count inner loop of FIG. 2B, the epilog phase of inner loop 210 for the first outer loop iteration is reached before the prolog phase of the loop for the second iteration of the outer loop ends, and the two phases overlap during II(4). The first stage of the prolog phase of inner loop 210(b) also executes during II(4). As indicated in the figure, the pipeline of inner loop 210 can extend over more than two outer loop iterations. For example, the inner loops begun during the first and second outer loop iterations do not complete until the third and fourth outer loop iterations, respectively.

The present invention is illustrated with reference to the following nested loop:

```
Real*4 A(10,100), B(10,100), C(10,100)
DO J=1, 100
    DO I = 1,3
        A(I,J) = B(I,J)/C(I,J)
    ENDDO
ENDO
```

Here, each element of the two dimensional array A, e.g. A(i, j), is provided by dividing the $(i, j)^{th}$ element of array B by the $(i, j)^{th}$ element of array C. While nested loop (I) is a perfectly nested loop, i.e. the body of the outer counted loop (DO J=1,100) consists solely of the inner counted loop (DO I=1, 3), the present invention is not limited to perfectly nested loops.

Without benefit of the present invention, a compiler developed for the 64 bit architecture of Intel® Corporation of Santa Clara, Calif., ("IA64") pipelines the inner loop of nested loop (I) into 12 stages having an initiation interval (II) of 5 clock cycles. In addition, 5 clock cycles are used to reset the addresses of the three arrays for each iteration of the outer loop and to adjust the loop tracking parameters (discussed below). If the outer loop body includes instructions in addition to those of the inner loop, the set up interval may increase to accommodate them. Using conventional modulo-scheduling techniques, the IA64 compiler generates the following intermediate code segment (II) for the exemplary nested loop (I):

```
(II)    Outer_Loop
            .....
            mov pr.rot = 0x10000
            mov ar.ec = 12
            mov ar.lc = 2
        Inner_Loop
            .....
            .....
            br.ctop             Inner_loop
            .....
            cmp4.1e p7, p6 = r2, r14
            (p7) br.cond        Outer_Loop
```

Figure 1C:
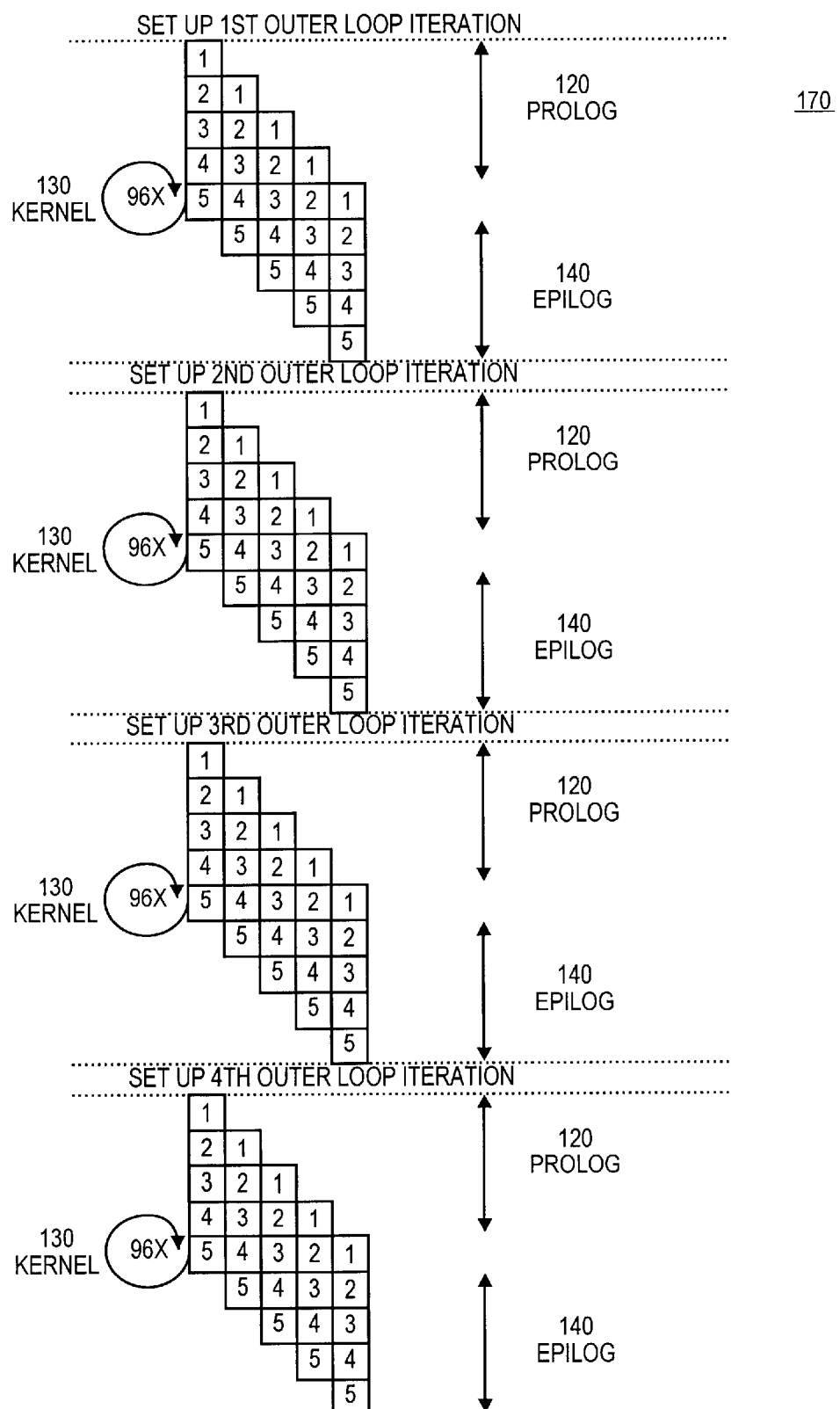
FIG. 1C represents a nested loop that has been implemented using conventional software pipelining methods.
Figure 1D:
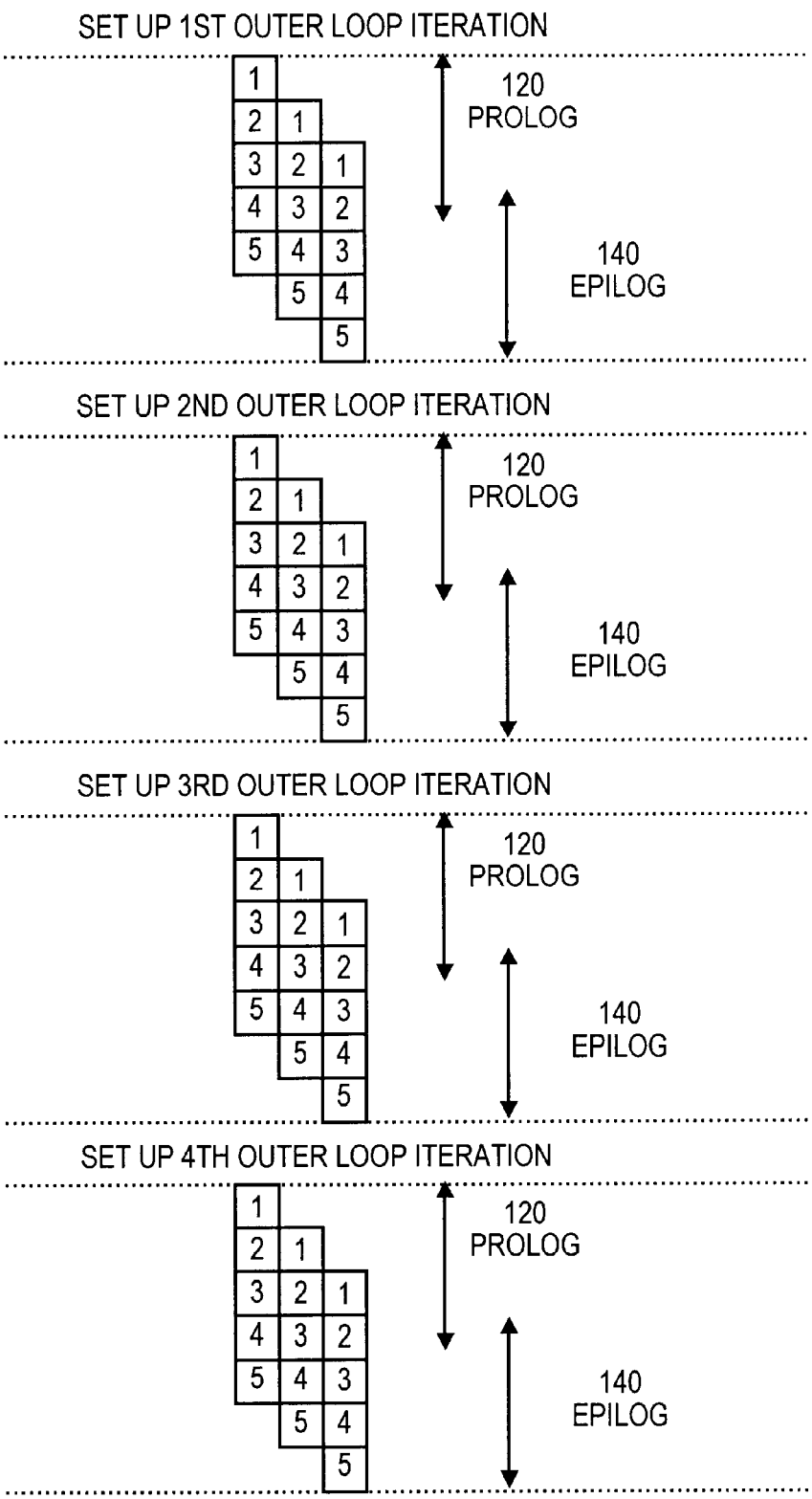
FIG. 1D represents a short trip count nested loop that has been implemented using conventional software pipelining methods.

The mov instructions in Outer_Loop initialize a rotating segment of the predicate registers (pr.rot), along with epilog and loop counters, ar.ec and ar.lc, respectively, for the inner loop. General registers r2 and r14 store the number of iterations executed and the trip count, respectively, for the outer loop. They are used to determine whether additional iterations of the outer loop remain. Execution of code segment (II) generates a nested loop structure similar to that shown in FIG. 1C (FIG. 1D for short trip count loops). In particular, the software pipeline of Inner_Loop is filled and drained for each iteration of Outer_Loop, before the next iteration of Outer_Loop begins. During the set up portion of Outer_Loop, the mov, cmp4.1le, and branch instructions are executed along with any other instructions that may be present in the outer loop.

The time required to execute the exemplary nested loop, using conventional modulo-scheduling techniques is:

100*(5+3*5+11*5)=7500 cycles

The first term in parenthesis represents the 5 cycle overhead for resetting the arrays and loop tracking parameters. The second term represents the cycles consumed by the kernel phase of the inner loop, and the last term represents the cycles consumed by the epilog phase of the inner loop. The above values are provided to illustrate certain advantages of the present invention, which may be applied to nested loops independent of the number of stages they contain or the number of times the inner loop is iterated.

Figure 3:
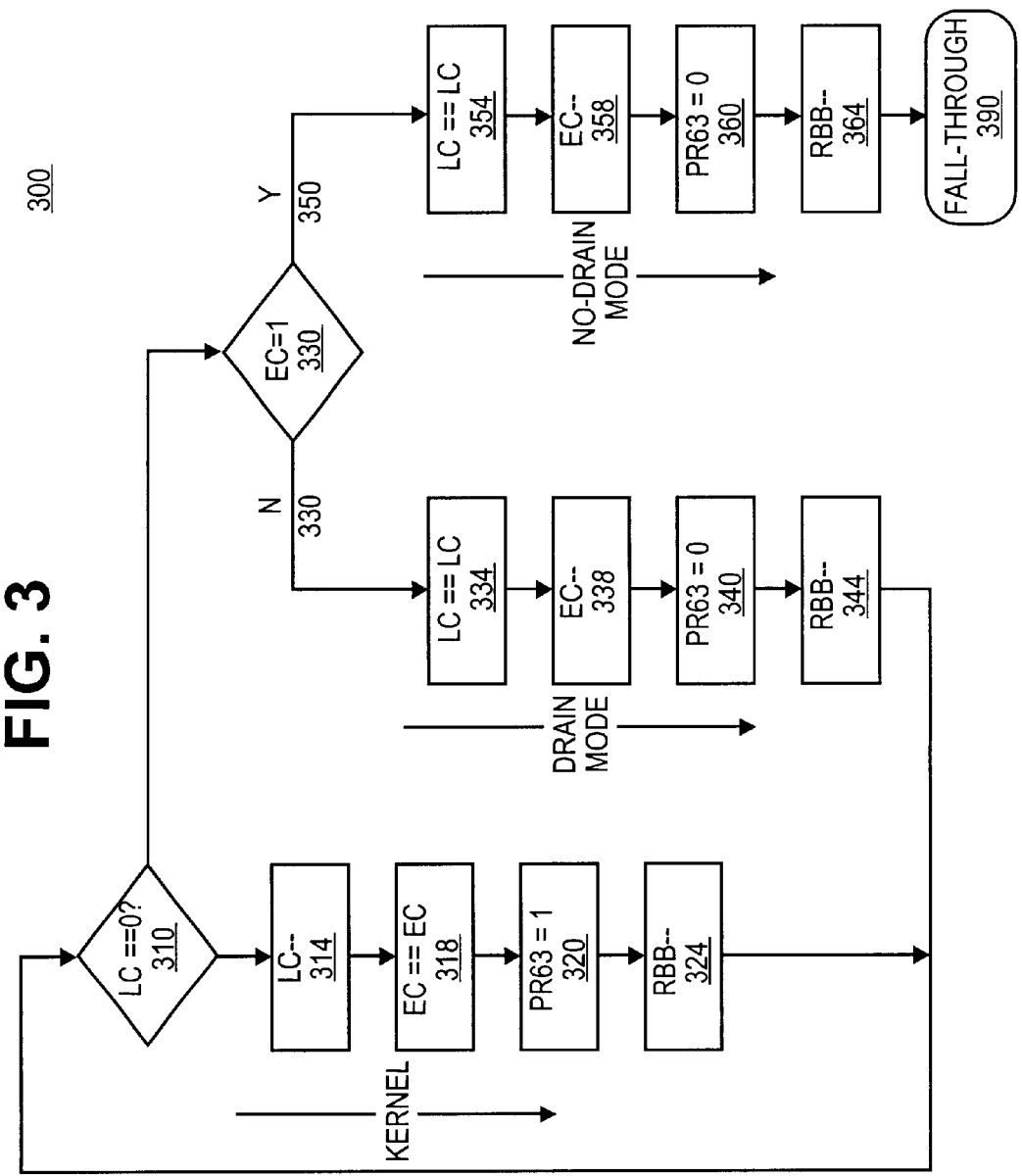
FIG. 3 is a flow chart representing one embodiment of a modulo-scheduled counted loop branch instruction suitable for use with the present invention.

In order to appreciate the advantages of the present invention, it is useful to understand the mechanisms through which loop branch operations may be controlled. FIG. 3 is a flow chart representing the operation of one embodiment of the branch instruction, br.ctop, in nested loop (I). The operations represented in FIG. 3 correspond to those implemented by a CTOP branch in the IA-64 instruction set architecture (ISA) of Intel® Corporation. Other ISAs that support software pipelining provide comparable functionality through various combinations of instructions, hardware, and compiler support.

For the disclosed counted branch, LC is tested 310 for each iteration of a loop. If LC>0, the loop is in its kernel or prolog phase. LC is decremented 314, a (software pipeline) stage predicate is written 320, and a rotating register base (RRB) value is decremented 324. Writing one to the stage predicate ensures that all active stages of the software pipeline remain active when the registers are rotated. The value of EC, which is typically initialized to the number of stages in the loop, is preserved 318 through the kernel phase, as indicated.

When LC reaches zero 310, all iterations of the loop have been started and the epilog phase is reached. Branching operation determines 330 whether to enter the epilog phase (330) or fall-through (350) to the instructions that follow the loop. In the epilog phase (LC=0, EC>1), the loop traverses path 330 (drain mode) to drain the stages of the software pipeline. When the "fall through" condition is detected (LC=0, EC=1), the loop status parameters are updated and control passes to the instructions following the loop. Under certain conditions, the fall through condition occurs for LC=0, EC=0, but the overall operation of the loop is similar.

The operations by which the software pipeline is drained are designated "drain mode" in FIG. 3. For the disclosed br.ctop, these operations include: decrementing EC 338 to update the loop status (another stage deactivated); writing a zero 340 to the stage predicate to deactivate the associated stage instructions; and decrementing RRB 344 to rotate the registers. The value of LC is preserved 334, and the loop controlled by branch 300 is repeated with the updated values of EC, RRB, and the stage predicate. This process is repeated until it is determined 330 that EC=1, at which point branch 300 enters the path labeled "no drain mode". In this state, branch 300 performs a last set of bookkeeping steps 354, 358, 360, 364, and "falls through" to the instruction(s) that follow the loop.

In the conventional implementation of nested loop (I), i.e. code segment (II), br.ctop falls through to a compare instruction (cmp4.le), which determines whether additional iterations of Outer_Loop remain. If they do, the predicate p7 is true and the outer loop branch, br.cond, directs the instruction flow back to Outer_Loop. For each new iteration of Outer_Loop, the inner loop is initialized through the series of mov instructions and executed according to the initialized values. As indicated in FIGS. 1C and 1D, executing the inner loop includes filling the pipeline during the prolog phase and draining the pipeline during the epilog phase for each iteration of the outer loop.

For one embodiment of the present invention, the overhead associated with the inner loop epilog and prolog stages is reduced by bypassing the stage draining operations of the inner loop epilog phase for each iteration of the outer loop except the last iteration. One way to accomplish this is represented by code segment (III):

```
(III)                       mov pr.rot = 0x10000
                            mov ar.ec = 1
            Outer_Loop:
                            mov ar.lc = 2
                            .....
(IIIa) Inner_Loop:
                            .....
                            .....
                            btr.ctop      Inner_Loop
                            .....
                            cmp4.1e p7, p0 = r2, r14
                            cmp4.eq p6, p0 = r2, r14
                            (p7) cmp4e.eq p16 = r0, r0
                            (p7) mov ar.ec = 1;;
                            (p6) mov ar.ec = 12
                            (p7) br.cond Outer_Loop
```

For the modified exemplary loop, the inner loop is initialized with EC =1, prior to the first iteration of Outer_Loop. For each iteration of Outer_Loop, LC is initialized to the appropriate value for Inner_Loop, and Inner_Loop is executed until the kernel condition (LC =0) is met, i.e. the epilog is reached. Referring to FIG. 3, when LC =0, branch 300 leaves the kernel phase and checks the status 330 of the epilog phase. In the exemplary code, EC is initialized to 1 and this value is preserved through the kernal phase, e.g. via 318. With EC at 1, branch 300 proceeds down the "no-drain" path (350) and falls through to the instruction(s) that follow Inner_Loop. Thus, initializing EC to one allows the inner loop to bypass the pipelining draining operations of epilog phase of branch 300.

Following Inner_Loop, instructions determine whether more iterations of Outer_Loop remain (cmp4.1e) or whether the final iteration of Outer_Loop has been reached (cmp4.eq). In the first case, the stage predicate is reset (comp4.eq p16=r0, r0), EC is reset to 1 (mov ar.ec=1), and Outer_Loop is reentered (br.cond Outer_Loop). In the second case, the stage predicate is reset and EC is initialized to indicate the actual number of inner loop stages, e.g (mov ar.ec=12) in the exemplary loop. Referring to FIG. 3, initializing EC to 12 directs Inner_Loop to "drain mode" for successive iterations, until EC reaches 1. Thus, on the final iteration of Outer_Loop, Inner_Loop traverses stage draining path 330 until its pipeline is fully drained. This allows all instructions associated with the last iterations of Inner_Loop to complete.

The time required to execute nested loop (I), as implemented by code segment (III) according to the present invention is:

$$100*(6+3*5)+11*5=2155 \text{ cycles}$$

The first term in parenthesis represents the 6 cycle overhead for resetting the arrays and registers in modified code (III). The additional clock cycle overhead for code segment III represents the relatively minor cost of implementing the present invention. The second term represents the cycles consumed by the kernel phase of the inner loop. The last term on the right hand side represents the cycles consumed by the epilog phase of the inner loop in modified code (III). Since the epilog and prolog phases of consecutive inner loop pipelines are overlapped for all but the final iteration of the outer loop, the clock cycles consumed by the inner loop epilog phase only contributes once to overall processing time.

For exemplary nested loop (I), the inner loop is a CTOP branch, whose loop conditions (310, 330) are tested at the end of the loop body, respectively. The present invention may also be implemented for counted loops in which the loop condition is tested somewhere other than the end of the loop body. These are referred to as CEXIT branches in the IA64 ISA. In addition, the present invention may be implemented for while-type inner loops. The IA64 ISA supports both TOP and EXIT variants of while-type loops (WTOP, WEXIT), which are tested similarly to the corresponding modulo-scheduled counted loops, CTOP and CEXIT, respectively.

Another method for implementing the present invention is represented by the following code segment (IV):

```
(IV)                    mov pr.rot = 0x10000
                        mov r2 = 100
                        mov p6 = 0
        Outer_Loop:
                        (p16) add r2 = r2, -1
                        (p16) mov ar.ec = 1
                        (p16) mov ar.lc = 2
                        (p6) mov ar.ec = 11
                        (p6) move ar.lc = 0
(IVa) Inner_Loop:
                        ...
                        br.ctop       Inner_Loop
                        (p17) comp4.gt.unc p16, p6 = r2, r0
                        ...
```

```
                        (p16) br.cond    Outer_Loop
                        (p6) br.cond     Outer_Loop
```

For code segment (IV), general register r2 is initialized to the trip count for Outer_Loop and decremented (add r2=r2, −1) on each iteration of Outer_Loop. General register r0 is hardwired to 0. Predicate register p6 becomes true when the last iteration of Outer_Loop is reached, and predicate register p16 stores the complement of p6 (com4.gt.unc p16, p6=r2, r0). Predicate register, p17, is true as long as at least one more iteration of Outer_Loop remains. If at least one outer loop iteration remains (p16 is true), inner loop parameters, EC and LC, are set to 1 (no drain mode) and 2, respectively. If the final iteration of the outer loop is completed (p6 is true), inner loop parameter EC is initialized for drain mode (EC=SC−1=11) and LC is set to zero to indicate that the epilog has been reached. The loop body instructions of Inner_Loop are executed, and since p17=0 now, both p16 and p6 are reset because they are defined by an unconditional compare instruction (cmp4.gt.unc p16, p6=r2, r0).

Yet another method for implementing the present invention is represented by the following code segment (V):

```
(V)                     mov    r14 = 99
                        mov    pr.rot = 0x10000
                        mov    ar.ec = 0
                        mov    ar.lc = 2
        Outer_Loop (Va):
                        A
                        cmp.gt p7, p6 = r14, 1
                        add    r14 = r14, −1;
                        (p6) mov    ar.lc = 12
        Inner_Loop:
                        . . .
                        br.ctop        Inner_Loop;;
                        B
                        (p7) mov    ar.lc = 3
                        br.ctop        Outer_Loop
```

For code segment (V), A and B represent any outer loop instructions that are executed before and after, respectively, the inner loop. For this embodiment, the last iteration of the outer loop is checked at the top of the outer loop (cmp.gt p7, p6=r14, 1). If the last iteration is detected, p6 is true, and EC is adjusted to fully drain the inner loop pipeline (mov ar.ec=12). If additional outer loop iterations remain, EC remains 0.

After the inner loop is executed, the value of LC is set to the inner loop trip count (mov ar.lc=3), when additional outer loop iterations remain, i.e. p7 is true. This allows a br.ctop instruction to be used for the outer loop closing branch as well. The outer loop br.ctop decrements LC to the inner loop trip count −1, sets the stage predicate (p63) to 1, eliminating an intialization step, and implements the register rotation that is not done by the inner loop closing branch (br.ctop) when EC=0 (no drain mode). For the last outer loop iteration, p7 is false, the inner loop exits with the correct LC and EC values (0 and 1, respectively), and the outer loop falls through. The outer loop instructions, A and B, are executed exactly the required number of times, without any additional predication.

Code segments (III), (IV) and (V) represent just three of the many ways of implementing the present invention. Persons skilled in the art of computer programming, having the benefit of this disclosure, will recognize variations on these code segments which may accomplish the same efficiencies.

Exemplary code segments (III), (IV) and (V) and their variants are suitable for any type of software pipelined inner loop that is nested within an outer counted loop. The number of outer loop iterations is known at the outset and reflected in the initial values of r14 for code segments III and V, and r2 for code segment (IV). The present invention is also applicable to while-type outer loops, as long as provisions are made to drain the inner loop software pipeline for the last iteration of the outer loop. For while-type loops, the trip count is not known when the nested loop is initiated. The loop status is indicated by a predicate, which is generated and tested on each iteration of the outer loop. If the inner loop is executed in no-drain mode and it is subsequently determined that the last outer loop iteration has completed, the inner loop pipeline will remain to be drained. Different methods for doing this are indicated in FIG. 4.

Figure 4:
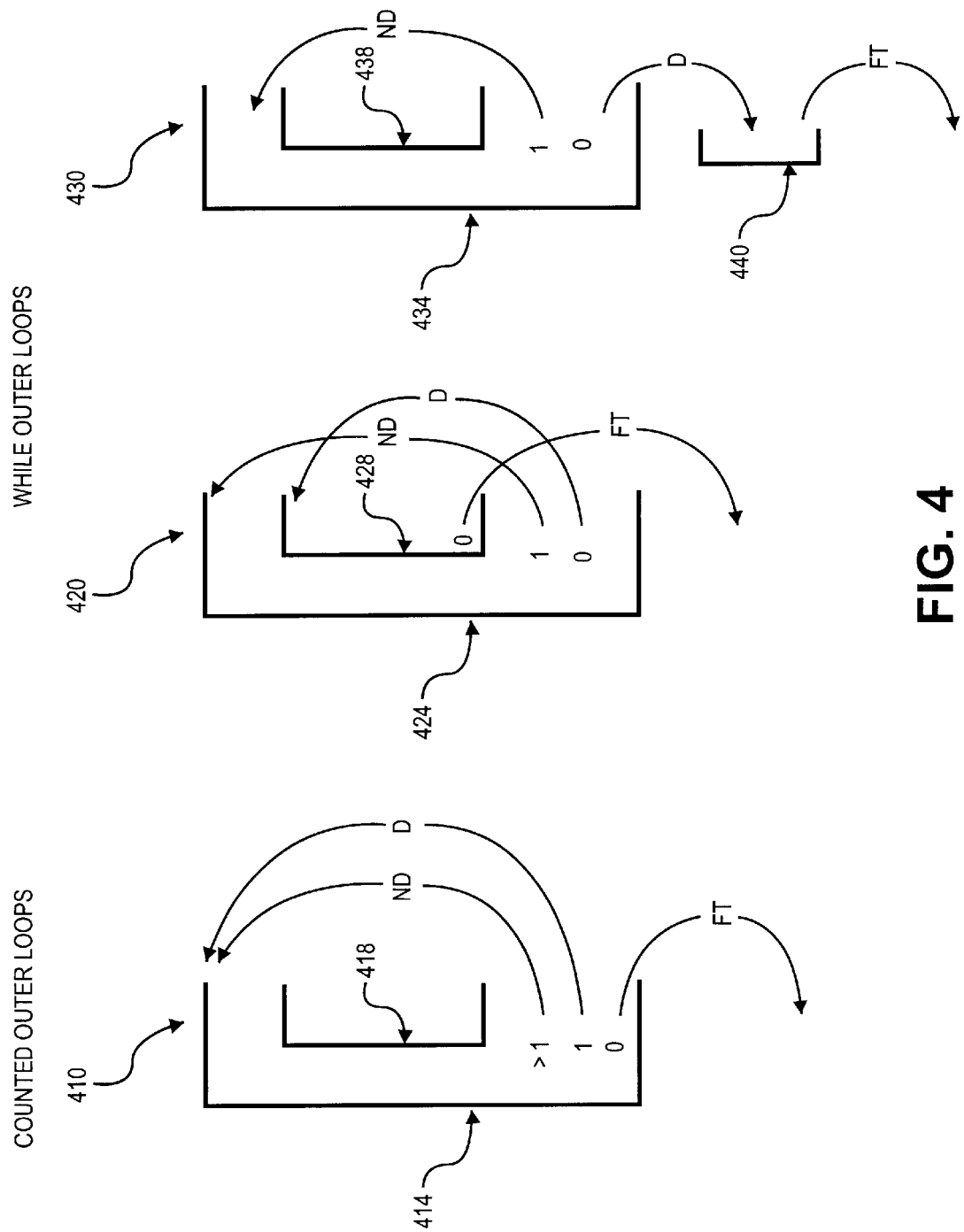
FIG. 4 represents the control flow in counted and while-type loops that have been modified in accordance with the present invention.

FIG. 4 represents a counted nested loop 410 and while-type nested loops 420, 430 implemented in accordance with the present invention. For nested loop 410, which includes a counted outer loop 414, inner loop 418 is executed in no-drain (ND) mode as long as more than 1 iteration (>1) remains. On the last iteration (=1) it is executed in drain (D) mode, and nested loop 410 falls through (FT) to the instructions that follow it. Because while type loops do not recognize their last iteration until it is in progress, the iterations (>1) and (=1) are not distinguished.

For nested loop 420, which includes a while-type outer loop 424, inner loop 428 is executed in ND mode while the outer loop condition is true (=1). In the disclosed example, final iterations of inner loop 428 are executed in D mode, when the outer loop condition is false (=0), and inner loop 428 jumps directly to the fall through instructions when it completes. Alternatively, a nested loop 430 that includes a while-type outer loop 434 may execute its inner loop 428 in ND mode as long as the outer loop condition remains true (=1). When the outer loop condition becomes false (=0), control may jump to code 440 following outer loop 434 that drains inner loop 438 and then falls through.

Figure 5:
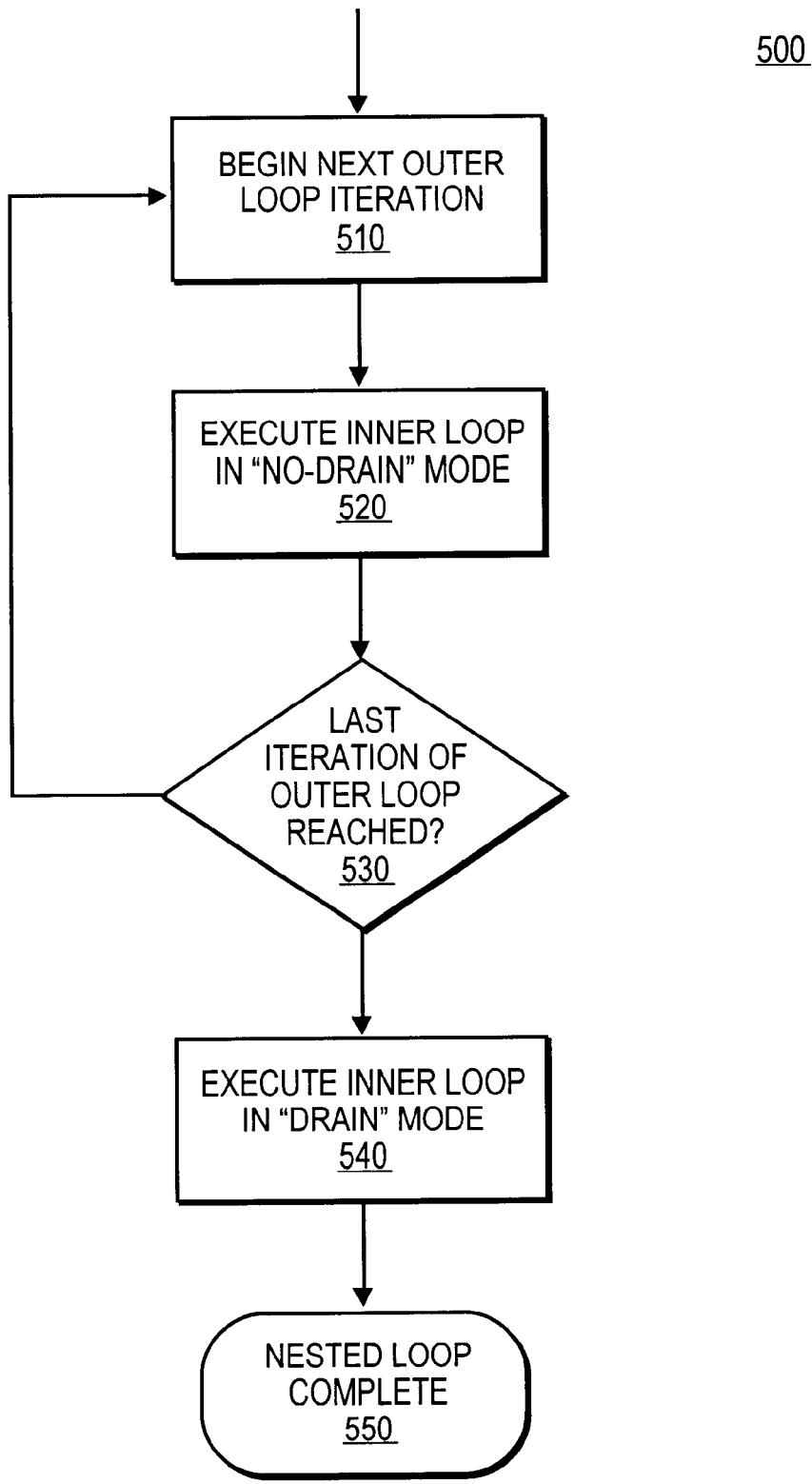
FIG. 5 is an overview of a method for processing nested loops in accordance with the present invention.

FIG. 5 is a flowchart representing an overview of a method in accordance with the present invention for processing nested loops. The nested loop is initiated by beginning 510 an iteration of the outer loop. The outer loop instructions include an inner loop, which has been modulo scheduled. The inner loop is executed 520 in a "no-drain" mode for the current iteration of the outer loop. As above, "no-drain" mode means that the inner loop is initialized to bypass its epilog phase when it is executed during the current iteration of the outer loop. The inner loop software pipeline for this iteration of the outer loop is drained during the next iteration of the outer loop, as the inner loop software pipeline for the next outer loop iteration is filled.

The status of the outer loop is tested 530 to determine whether its last iteration has been reached. If it is determined 530 that the next iteration of the outer loop is not the last iteration, the next iteration begins 510, and the inner loop is executed 520 in no-drain mode. If the next iteration of the outer loop is determined 530 to be the last iteration, the inner loop is executed 540 in "drain" mode, i.e. normally, and the nested loop is completed 550.

Figure 6:
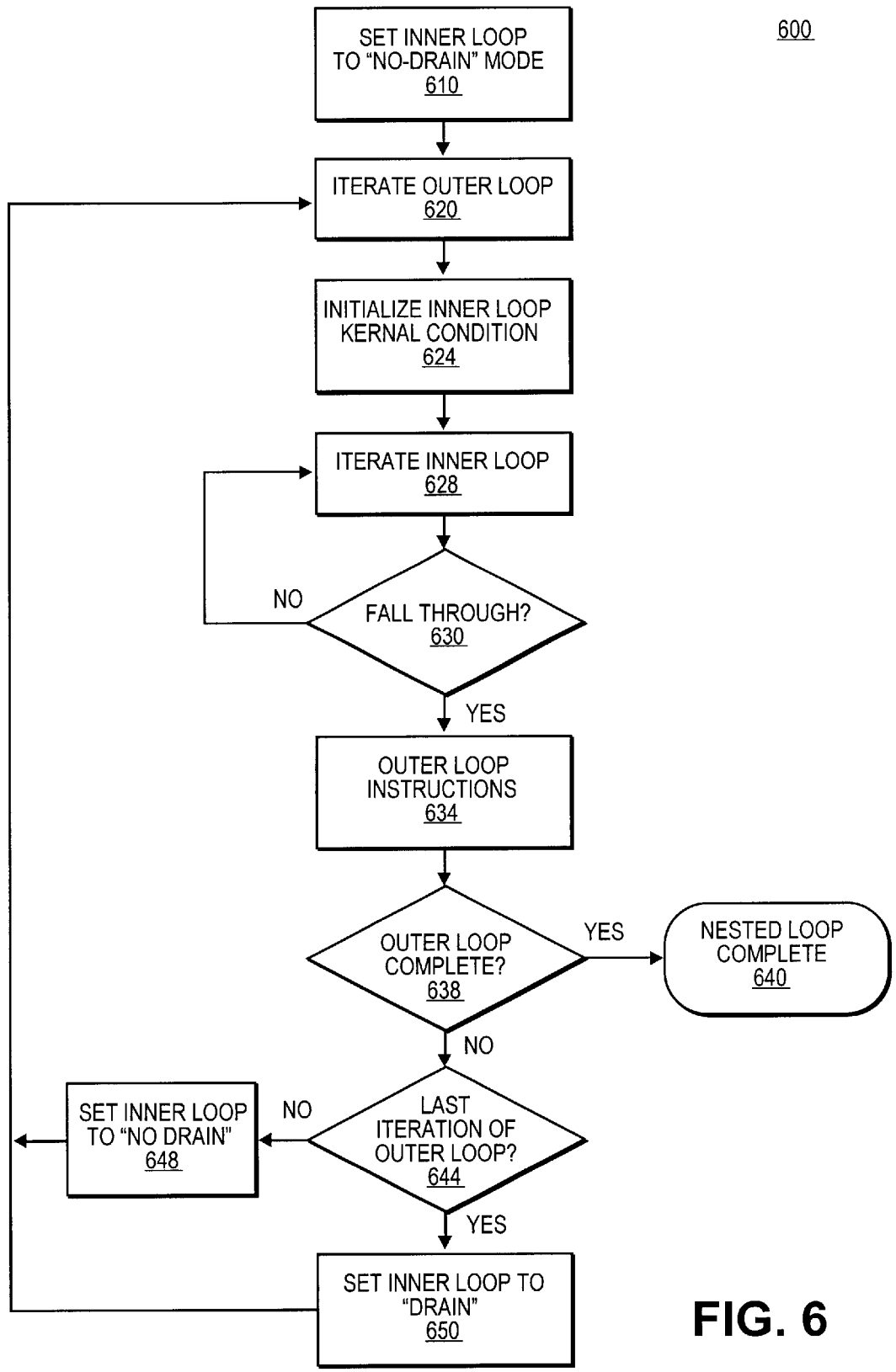
FIG. 6 is a more detailed flowchart representing one embodiment of the method of FIG. 5.

FIG. 6 is a flowchart representing one embodiment of method 500 in greater detail. When. a nested loop is initiated, the modulo-scheduled inner loop is initialized 610 to "no-drain" mode. This may be accomplished, for example, by initializing a loop status parameter such as EC to indicate that there are no stages to be drained from the software pipeline of the modulo-scheduled inner loop.

An iteration of the outer loop is initiated 620, and a kernel condition for the inner loop is initialized 624. For a counted inner loop, the kernel condition may be initialized by setting a loop counter parameter (LC) equal to the number of logical iterations for the counted loop. For a while-type loop, the kernel condition is typically represented by a logical expression that is determined dynamically for each iteration of the loop. The logical expression is tested for each loop iteration, and a new iteration of the loop is begun when the logical condition is, e.g. true. In this case, initialization may correspond to setting the logical expression true (or false) for the first iteration of the inner loop.

The inner loop is iterated 628 and a "fall-through" condition is tested 630 to determine whether the loop should continue. For IA64 top-type loops (CTOP and WTOP) in "no-drain" mode, the fall-through condition is met when the kernel condition is false, e.g. LC=0 for a CTOP branch and br.pr=0 for a WTOP branch. In each case, the inner loop is exited without draining the associated software pipeline.

Once the fall-through condition occurs for the inner loop, any instructions in the outer loop that follow the inner loop are executed 634 and the outer loop is tested 638 for completion. If the last iteration of the outer loop has completed, the nested loop is complete 640. If iterations of the outer loop remain, it is determined 644 whether the last iteration of the outer loop has been reached. If the last iteration of the outer loop has not been reached, the inner loop is set to "no-drain" mode and the next iteration of the outer loop is begun 620.

For the last iteration of the outer loop, the inner loop is set 644 to "drain" mode, e.g. EC is initialized to indicate the inner loop stage count, and the final iteration of the outer loop is begun 620. For this final outer loop iteration, the "fall through" condition for the inner loop does not coincide with the kernel condition. That is once the kernel condition is met, the controlling loop branch continues to iterate the inner loop to drain the software pipeline. For the exemplary CTOP loop, "drain" mode is entered by setting EC to equal the actual number of stages in the modulo-scheduled loop. In FIG. 3, this means that the inner loop traverses drain path 330 when the kernel condition 310 is true, until the epilog condition (EC=1) is also true.

Methods 500 and 600 may be adjusted for CEXIT and WEXIT branches to reflect their different looping behavior. That is CEXIT and WEXIT branches continue to their respective loops when they "fall through" and terminate their respective loops when they are taken. For CEXIT and WEXIT branches in "no-drain" mode, the fall through condition 630 is met when the kernel condition is true, and the inner loop continues executing. When the kernel condition becomes false for a CEXIT or WEXIT loop in "no-drain" mode, the inner loop is exited without draining the associated software pipeline. In "drain" mode, the fall through condition for CEXIT and WEXIT branches depends on both the kernel and epilog variables. In drain mode, CEXIT and WEXIT branches continue to loop when their kernel conditions are false, until their pipelines are emptied.

One advantage of the present invention is that it provides for efficient processing of nested loops without significantly expanding the initiation interval of the software pipeline stages or the code size. For example, loop collapsing is a method for handling nested loops that combines inner and outer loops into a single loop. This approach often requires the addition of new instructions to the collapsed loop to track the parameters of the component loops. In some cases, the additional instructions may implement high latency calculations, which further expand the initiation interval. The present invention does not require any significant additions to the instructions of the nested loop, and it may be used to increase the efficiency of a variety of nested loops.

The present invention has been described for cases in which any "live-in" values, i.e. values input to the inner loop, are either written to static registers for use in the first stage of the inner loop or are input to rotating registers for the inner loop. It is also possible to accommodate loops in which live-in values are written to static registers in stages other than the first stage, provided the stages of the inner loop executed in no-drain and drain modes are also adjusted. Adjustments to the "drain" and "no-drain" modes for the more general case are illustrated below.

Let N1 represent the latest stage of the inner loop that receives a live-in value in a static register, and let N2 represent the latest stage of the inner loop that defines a live-out value (a value used by the outer loop). For no-drain mode, EC is set to the larger of N1 and N2, e.g. $EC_{ND}$=Max (N1, N2), and the epilog phase of the inner loop is executed until ($EC_{ND}$−1) stages are drained for a given outer loop iteration. The remaining stages are executed during the next outer loop iteration, in parallel with the prolog phase of the inner loop pipeline for this next outer loop iteration. For drain mode, $EC_D$ is set to EC as before.

Figure 7:
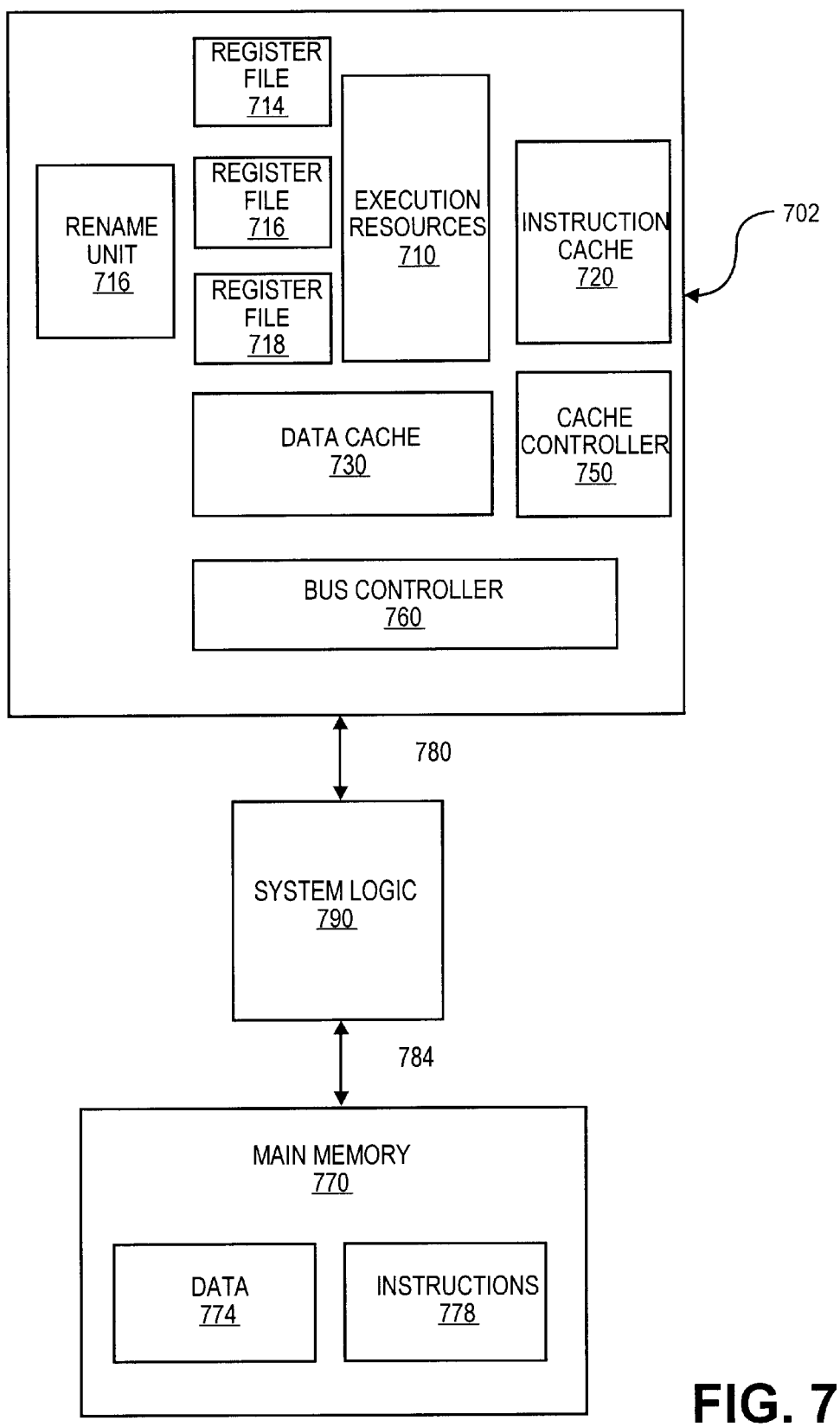
FIG. 7 is a block diagram of one embodiment of a computer system that is suitable for implementing the present invention.

FIG. 7 is a block diagram of one embodiment of a system 700 in which the present invention may be implemented. System 700 includes a processor 702 and a main memory 770 that are coupled to system logic 790 through a system bus 780 and a memory bus 784. System 700 typically also includes a graphics system and peripheral device(s) (not shown) which also communicate through system logic 790.

The disclosed embodiment of processor 702 includes execution resources 710, an instruction cache 720, a data cache 730, a cache controller 750, and a bus controller 760. Processor 702 typically also includes other logic elements (not shown) to retrieve and process instructions and to update its architectural state as instructions are retired. Bus controller 760 manages the flow of data and instructions between processor 702 and main memory 770. The present invention does not depend on the detailed structure of the memory system or the processor.

Instruction cache 720, data cache 730, and main memory 770 form a memory hierarchy that provides data and instructions to execution resources 710. The instructions operate on data (operands) that are provided from register files 714 or bypassed to execution resources 710 from various components of the memory hierarchy. A predicate register file 718 may be used to conditionally execute selected instructions in a program and implement software pipelining. An application register file 716 includes status and control registers, such as ar.lc and ar.ec, which govern selected operations. Operand data is transferred to and from register file 714 through load and store operations, respectively.

For the present invention, portions of register files 714, 718 may be rotated by a register renaming unit 716. When execution resources 710 implement a nested loop in accordance with the present invention, the status/control registers 716 indicate the current phase of the inner loop, and instructions direct the processor to process the loop in drain or non-drain mode accordingly. The instructions that implement the loop stages, pipeline filling, and pipeline draining operations are typically stored in an instruction region 778 of memory 770 during execution. They may be supplied to main memory from a non-volatile memory structure (hard disk, floppy disk, CD, etc.).

The disclosed embodiments of the present invention are provided solely for purposes of illustration. Persons skilled in the art of programming and having the benefit of this disclosure will recognize variations on the disclosed embodiments that fall within the spirit of the present inven-

What is claimed is:

1. A method, comprising:
   iterating an inner loop of a nested loop in a no-drain mode;
   determining if a final iteration of an outer loop of the nested loop has been reached; and
   iterating the inner loop in a drain mode if the final iteration of the outer loop is reached.

2. The method of claim 1, wherein iterating an inner loop in a no-drain mode comprises bypassing pipeline draining operations associated with an epilog phase of the inner loop during a current iteration of the outer loop.

3. The method of claim 2, wherein bypassing pipeline draining operations comprises:
   initializing a stage counter to a fall through value; and
   executing the inner loop.

4. The method of claim 1, wherein iterating the inner loop in drain mode comprises executing the inner loop through all pipeline draining operations of its epilog phase.

5. The method of claim 4, wherein executing the inner loop through all pipeline-draining operations comprises:
   initializing a stage counter to reflect all stages of the inner loop; and
   executing the inner loop.

6. The method of claim 1, wherein the inner loop includes one or more additional inner loops.

7. The method of claim 1, wherein executing the inner loop of the nested loop in no-drain mode comprises executing the inner loop to an inner loop epilog stage that transfers data between the inner and outer loops.

8. The method of claim 1, wherein determining if a final iteration of an outer loop of the nested loop has been reached further comprises determining if the beginning of the final iteration of the outer loop of the nested loop has been reached.

9. A method for processing an outer loop that includes a software pipelined inner loop, the method comprising:
   executing the inner loop until an epilog phase of the inner loop is reached for each of a first N−1 iterations of the outer loop;
   completing the epilog phase of the inner loop for each of the first N−1 outer loop iterations in a subsequent iteration of the outer loop; and
   executing the inner loop through the epilog phase for an $N^{th}$ iteration of the outer loop.

10. The method of claim 9, wherein executing the inner loop until an epilog phase is reached comprises:
    initializing the inner loop to bypass selected stages of its epilog phase for the first N−1 iterations of the outer loop; and
    executing the inner loop.

11. The method of claim 10, wherein the bypassed stages of the inner loop epilog stage are determined by which stages of the inner loop consume live-in values or generate live-out values.

12. The method of claim 11, wherein initializing the inner loop to bypass selected stages of its epilog phase comprises initializing a counter associated with the inner loop to indicate a number of stages of the inner loop to be drained.

13. The method of claim 9, wherein executing the inner loop through the epilog phase comprises:
    initializing the inner loop to execute all pipeline-draining operations of its epilog phase; and
    executing the inner loop.

14. A nested loop comprising:
    an outer loop having N iterations; and
    a software pipelined inner loop, the software pipelined inner loop to be executed in a no-drain mode for each of N−1 iterations of the outer loop and in a drain mode for an $N^{th}$ iteration of the outer loop.

15. The nested loop of claim 14, wherein the software pipelined inner loop executed in no-drain is executed up to its epilog phase during a current iteration of the outer loop and the epilog phase is executed during a subsequent iteration of the outer loop.

16. The nested loop of claim 15, wherein the software pipelined inner loop is a modulo-scheduled inner counted or while-type loop and the outer loop is a counted or while-type loop.

17. The nested loop of claim 14, wherein the software pipeline executed in drain mode is executed through its epilog phase during the $N^{th}$ iteration of the outer loop.

18. A machine readable medium on which are stored instructions to be executed by a processor to implement a method for processing a nested loop, the method comprising:
    iterating an outer loop of the nested loop N times;
    for a first N−1 iterations of the outer loop, executing an inner loop in a no-drain mode; and
    for a final iteration of the outer loop, executing the inner loop in a drain mode.

19. The machine readable medium of claim 18, wherein executing an inner loop in the no-drain mode comprises:
    executing the inner loop for a given iteration of the outer loop until an epilog phase of the inner loop is reached; and
    executing the epilog phase of the inner loop in a subsequent iteration of the outer loop.

20. The machine readable medium of claim 18, wherein executing the inner loop in no drain mode comprises executing a prolog phase of the inner loop for the current iteration of the outer loop concurrently with an epilog phase of the inner loop for a preceding iteration of the outer loop.

21. The machine readable medium of claim 18, wherein executing the inner loop in drain mode comprises executing the inner loop through its epilog phase for the current iteration of the outer loop.

22. The machine readable medium of claim 18, wherein executing an inner loop in a no-drain mode comprises executing the inner loop to an inner loop epilog stage that transfers data between the inner and outer loops.

23. A method for software pipelining a nested loop comprising:
    modulo-scheduling an inner loop of the nested loop, the modulo-scheduled inner loop having an epilog parameter;
    initializing the modulo-scheduled inner loop to execute with a first value of the epilog parameter for a first N−1 iterations of an outer loop of the nested loop; and
    initializing the modulo-scheduled inner loop to execute with a second value of the epilog parameter for an $N^{th}$ iteration of the outer loop.

24. The method of claim 23, wherein initializing modulo-scheduled inner loop to execute with a first value of the epilog parameter comprises setting the epilog parameter to bypass a portion of an epilog phase of the inner loop.

25. The method of claim 23, wherein initializing the modulo-scheduled inner loop to execute with a second value of the epilog parameter comprises setting the epilog parameter to execute all phases of the inner loop during the $N^{th}$ iteration of the outer loop.

26. A computer system comprising:
   a processor to execute instructions; and
   a memory in which are stored instructions executable by the processor to implement a method for processing a nested loop, the method comprising:
      executing an inner loop of the nested loop until an epilog phase of the inner loop is reached for each of N−1 iterations of an outer loop of the nested loop;
      executing the epilog phase of the inner loop for each of the N−1 outer loop iterations in a subsequent iteration of the outer loop; and
   executing the inner loop through the epilog phase for an $N^{th}$ iteration of the outer loop.

27. The computer system of claim 26, wherein executing the inner loop until an epilog phase is reached comprises bypassing pipeline draining operations for the inner loop.

28. The computer system of claim 27, wherein executing the epilog phase of the inner loop comprises executing the bypassed pipeline draining operations for an inner loop associated with a prior iteration of the outer loop while executing a prolog phase for an inner loop associated with a current iteration of the outer loop.

29. A method for processing an outer loop that includes a software pipelined inner loop, the method comprising:
   executing the inner loop until an epilog phase of the inner loop is reached for each of a first N−1 iterations of the outer loop;
   completing the epilog phase of the inner loop for each of the first N−1 outer loop iterations in a subsequent iteration of the outer loop; and
   executing the inner loop through the epilog phase for an $N^{th}$ iteration of the outer loop;
   wherein executing the inner loop until an epilog phase is reached further comprises:
      initializing the inner loop to bypass selected stages of its epilog phase for the first N−1 iterations of the outer loop; and
      executing the inner loop; and
   wherein initializing the inner loop to bypass selected stages of its epilog phase comprises initializing a counter associated with the inner loop to indicate a number of stages of the inner loop to be drained.

* * * * *